(12) United States Patent
Bryson et al.

(10) Patent No.: US 12,524,048 B2
(45) Date of Patent: Jan. 13, 2026

(54) SYSTEM AND METHOD FOR COOLING STORAGE OR ACCELERATOR DEVICES

(71) Applicant: Samsung Electronics Co., Ltd., Suwon-si (KR)

(72) Inventors: Matthew Bryson, Los Gatos, CA (US); Luka Daoud, Milpitas, CA (US); Sompong Paul Olarig, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 89 days.

(21) Appl. No.: 17/720,264

(22) Filed: Apr. 13, 2022

(65) Prior Publication Data

US 2023/0247804 A1    Aug. 3, 2023

Related U.S. Application Data

(60) Provisional application No. 63/306,083, filed on Feb. 2, 2022.

(51) Int. Cl.
| | |
|---|---|
| *G06F 1/20* | (2006.01) |
| *G11B 3/14* | (2006.01) |
| *G11B 33/14* | (2006.01) |
| *H05K 7/20* | (2006.01) |

(52) U.S. Cl.
CPC ............ *G06F 1/20* (2013.01); *G11B 33/1413* (2013.01); *H05K 7/20263* (2013.01); *H05K 7/20272* (2013.01); *H05K 7/20772* (2013.01); *H05K 7/20836* (2013.01); *H05K 7/20136* (2013.01); *H05K 7/20281* (2013.01); *H05K 7/20727* (2013.01)

(58) Field of Classification Search
CPC .......... H05K 7/20254; H05K 7/20272; H05K 7/20772; H05K 7/20136; H05K 7/20727; G11B 33/1413; G06F 1/20
See application file for complete search history.

(56) References Cited

U.S. PATENT DOCUMENTS

| | | | |
|---|---|---|---|
| 6,333,849 B1 * | 12/2001 | Donahoe ................. | G06F 1/203 |
| | | | 361/699 |
| 7,742,844 B2 | 6/2010 | Coxe, III | |
| 9,015,725 B2 | 4/2015 | Chen et al. | |
| 9,535,471 B2 * | 1/2017 | Davis ....................... | G06F 1/206 |
| 10,656,699 B2 | 5/2020 | Bailey et al. | |
| 10,765,036 B2 * | 9/2020 | Adrian ................. | G11B 33/128 |

(Continued)

FOREIGN PATENT DOCUMENTS

| | | | |
|---|---|---|---|
| JP | 2004353988 A | * | 12/2004 |
| WO | 2021161026 A1 | | 8/2021 |

OTHER PUBLICATIONS

European Extended Search Report for Application No. 23153886.9, mailed Jul. 6, 2023.

*Primary Examiner* — Zachary Pape
(74) *Attorney, Agent, or Firm* — Renaissance IP Law Group LLP

(57) ABSTRACT

A chassis may include a member. The member may include a system channel for a liquid coolant to flow and a slot in the member for a storage device. A liquid cooling block may be associated with the slot in the member. The liquid cooling block may include a block channel for the liquid coolant to flow to remove heat from the storage device.

18 Claims, 11 Drawing Sheets

(56) References Cited

U.S. PATENT DOCUMENTS

| | | |
|---|---|---|
| 2009/0229283 A1 | 9/2009 | Marsala |
| 2013/0098599 A1 | 4/2013 | Busch et al. |
| 2014/0049908 A1* | 2/2014 | Eriksen .................. G06F 1/187 |
| | | 361/679.53 |
| 2022/0007544 A1 | 1/2022 | Embleton et al. |
| 2023/0240053 A1* | 7/2023 | Turner ............... H05K 7/20763 |

* cited by examiner

SYSTEM AND METHOD FOR COOLING STORAGE OR ACCELERATOR DEVICES

RELATED APPLICATION DATA

This application claims the benefit of U.S. Provisional Patent Application Ser. No. 63/306,083, filed Feb. 2, 2022, which is incorporated by reference herein for all purposes.

FIELD

The disclosure relates generally to storage devices, and more particularly to cooling for storage devices and/or accelerators.

BACKGROUND

Over the years, the power drawn by storage devices has increased. New standards may support increased power draws by storage devices, and increased complexity of the storage device may also involve increased power draws. While an increased power requirement for a single storage device might not tax existing air-based cooling in a computer, a server including a large number of storage devices might have insufficient cooling capability. Similarly, even if an existing air-based cooling system is not taxed by cooling needs of other components, the existing air-based cooling system might have insufficient cooling capability to cool a single component with a high power requirement (for example, a storage device with a high power requirement).

A need remains for a way to improve the cooling of storage devices.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
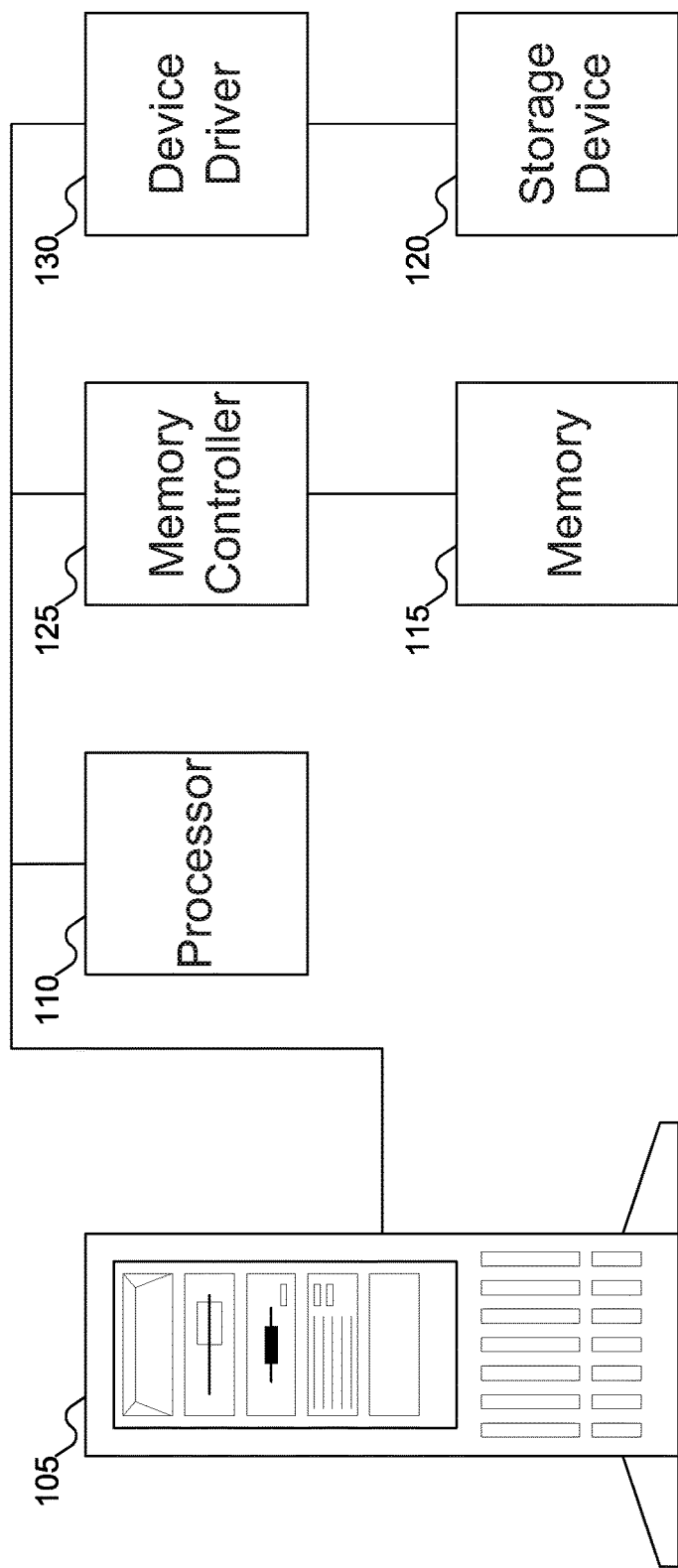
FIG. 1 shows a machine configured to provide liquid cooling to a storage device, according to embodiments of the disclosure.

Embodiments of the disclosure may include a liquid cooling block for a storage device. The liquid cooling block may include a block channel for liquid coolant to flow. The liquid cooling block may be associated with a slot for a storage device. A member may include a system channel in which the liquid coolant may flow.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Storage devices have evolved over time. While hard disk drives, with spinning platters, were once commonplace storage devices, particularly in datacenters, Solid State Drives (SSDs) have generally replaced hard disk drives. This has reduced power consumption: hard disk drives may consume, for example, 7-12 Watts (W) per hour when in use, whereas SSDs may consume, for example, 1-5 W per hour when in use.

But storage devices have also become more complex. Storage devices now may be paired with a computational storage unit, such as an accelerator, to perform additional functions beyond writing data to the storage device, reading data from the storage device, deleting data from the storage device, and storage device maintenance operations. While shifting processing from the host processor to a computational storage unit may reduce the load on the host processor, the computational storage unit may increase the power required by the storage device to execute those functions.

In addition, standards may increase the power to be supplied to storage devices. For example, the Small Form Factor (SFF) standard, or other suitable current or future standards, may support connectors that can transmit 40 W, 72 W, or even higher amounts of power. The Peripheral Component Interconnect Express (PCIe) standard, or other suitable current or future standards, also may recognize that power consumption for storage devices is increasing, and that cooling requirements may increase to manage the increased heat generated by additional power.

Embodiments of the disclosure address these problems by including metal (or other thermally conductive material) blocks with built-in liquid cooling. The cooling blocks may be part of the chassis of the server. Liquid cooling may remove heat from storage devices, rather than air cooling. By using liquid cooling, the heat may be removed from the storage devices without heat soaking other components in the chassis. Air bypass channels may enable existing air cooling to continue to remove the heat generated by other components in a server (for example, the host processor).

Embodiments of the disclosure may support dissipating the heat by using rack or datacenter level heat exchangers, with the cooled liquid returned for reuse. Embodiments of the disclosure may also support dissipating heat by using a radiator to dissipate heat in a manner that avoids exposing other components to heat (for example, by using a radiator at the back of the server rather than blowing air across the liquid and onto other components).

Embodiments of the disclosure may also support establishing zones of storage devices. Each zone may request different levels of cooling to support different power levels. The system may determine whether the cooling system is operating at maximum cooling. If the system is not at maximum cooling, then the zone may receive its increased cooling request; otherwise, the system may reduce the cooling to other zones before the zone may receive its increased cooling request.

FIG. 1 shows a machine configured to provide liquid cooling to a storage device, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may each support any desired protocol or protocols, including, for example, the Non-Volatile Memory Express (NVMe) protocol. Different storage devices 120 may support different protocols and/or interfaces.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. Further, different types of storage devices may be mixed. For example, one storage device 120 might be a hard disk drive, and another storage device 120 might be an SSD.

While FIG. 1 suggests that machine 105 may be, for example, a desktop tower computer, embodiments of the disclosure may extend to any desired form factor. For example, machine 105 may be a server and may include two or more storage devices.

Figure 2:
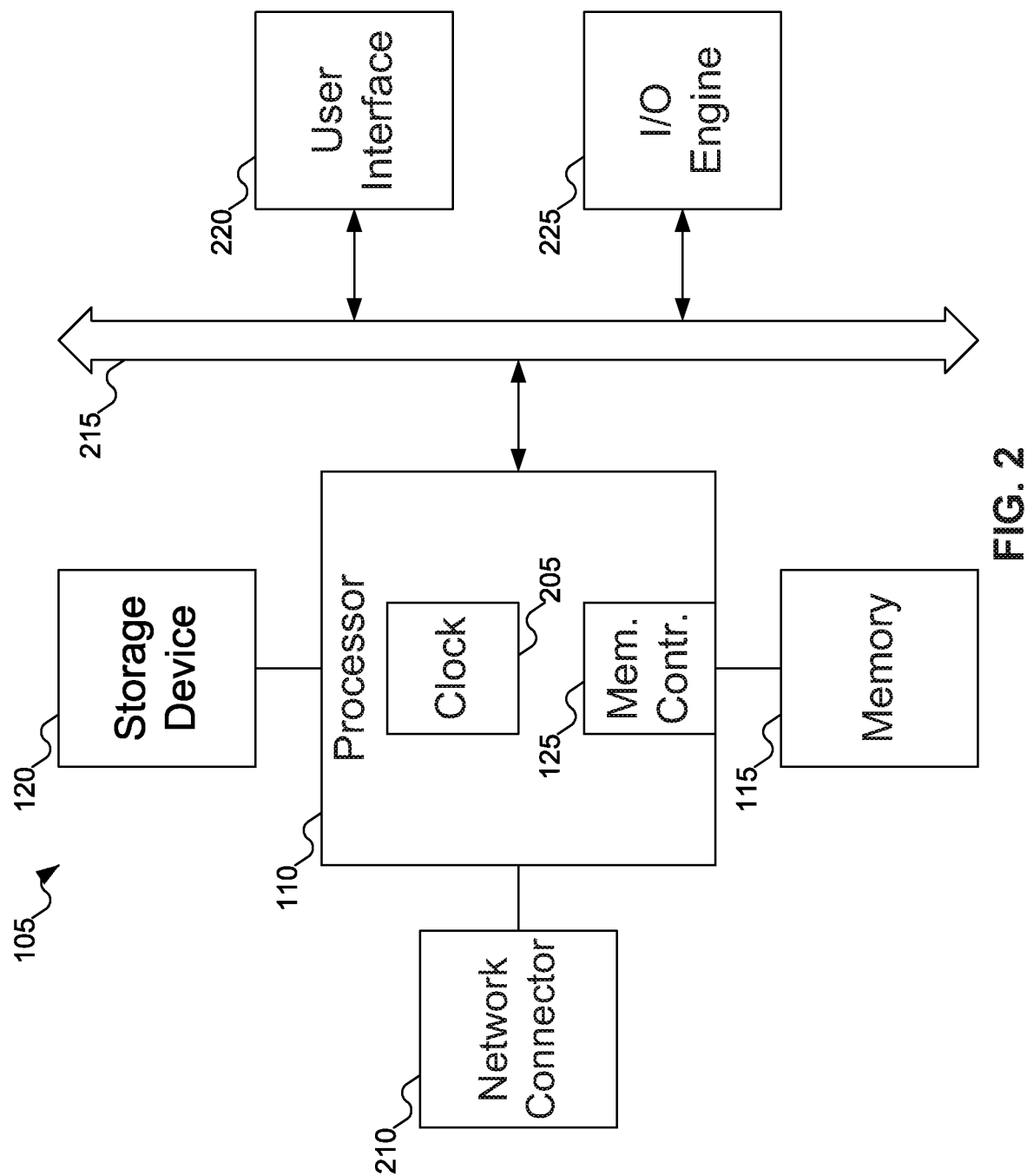
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Improvements in technology would suggest that power drawn by components, such as storage device 120, may go down over time (that is, technology may improve efficiency). But while technology may become more efficient as time passes, technology may also increase the expectations of components. For example, while Solid State Drives (SSDs) tend to use less power than hard disk drives of comparable size, increased bandwidth expectations may increase the power used by newer storage devices. Further, in addition to controllers (or possibly expanding on or replacing them), storage devices are starting to include their own processors (which may be termed accelerators, computational devices, or computational storage units), which may be implemented using a central processing unit (CPU), a graphics processing unit (GPU), a general purpose GPU (GPGPU), a data processing unit (DPU), a tensor processing unit (TPU), a neural processing unit (NPU), a field programmable gate array (FPGA), or an application-specific integrated circuit (ASIC), to name some examples. These processors may draw power comparable to processor 110. Thus, it may happen that storage device 120 may use more power when compared with older storage devices, rather than less. If machine 105 includes multiple storage devices, each or which includes such a processor, the power used by such storage devices 120 might represent a significant percentage of the total power used by machine 105.

Power may translate to heat: the more power used by components in machine 105, the more heat those components may be expected to generate. Even drawing 40 W by a single storage device, particularly one without a heat sink, might result in storage device 120 generating enough heat to lead to throttling of the input/output load, or even device shutdown to protect the device from dangerous amounts of heat. And some connectors may support 72 W or more per storage device.

Machine 105 might rely on air cooling systems, such as fans, to draw away and dissipate heat. Such air cooling systems may suffice when the overall amount of heat is kept relatively low. For example, if processor 110 and a graphics card are responsible for a significant percentage of the power used by machine 105, air cooling may suffice to keep machine 110 sufficiently cool. Even if machine 105 is a server, and machine 105 includes, for example, 24 storage devices (either SSDs or hard disk drives), the heat generated by the components in machine 105 may be sufficiently cooled using air cooling system.

But if machine 105 includes multiple storage devices, some of which or each of which includes a computational device, the storage devices might generate a significant amount of heat by themselves. In fact, the storage devices might generate enough heat that air cooling systems might not be able to adequately cool machine 105, even if not including accelerators.

Even worse, in some embodiments of the disclosure, storage device 120 may be at the front of machine 105 (to facilitate easy access to storage device 120 in case storage device 120 may require replacement). But the air cooling system may place fans at the back of machine 105, with air drawn from the front of machine 105 to the back of machine 105. In such situations, the heat generated by storage device 120 may warm the air coming into machine 105 before other components (such as processor 110) may be cooled by that air. In other words, the added power drawn by storage device 120 may heat soak processor 110 or other components of machine 105. In embodiments of the disclosure, the term "heat soak" may describe exposing some components to the heat generated by other components, which may either increase the heat of the latter components or may reduce the effectiveness of cooling mechanisms for the latter components (by also managing heat generated by the earlier components). While this heat soaking could be mitigated by moving storage device 120 to the back of machine 105, moving storage device 120 to the back of machine 105 might make swapping storage device 120 more difficult.

Figure 3:
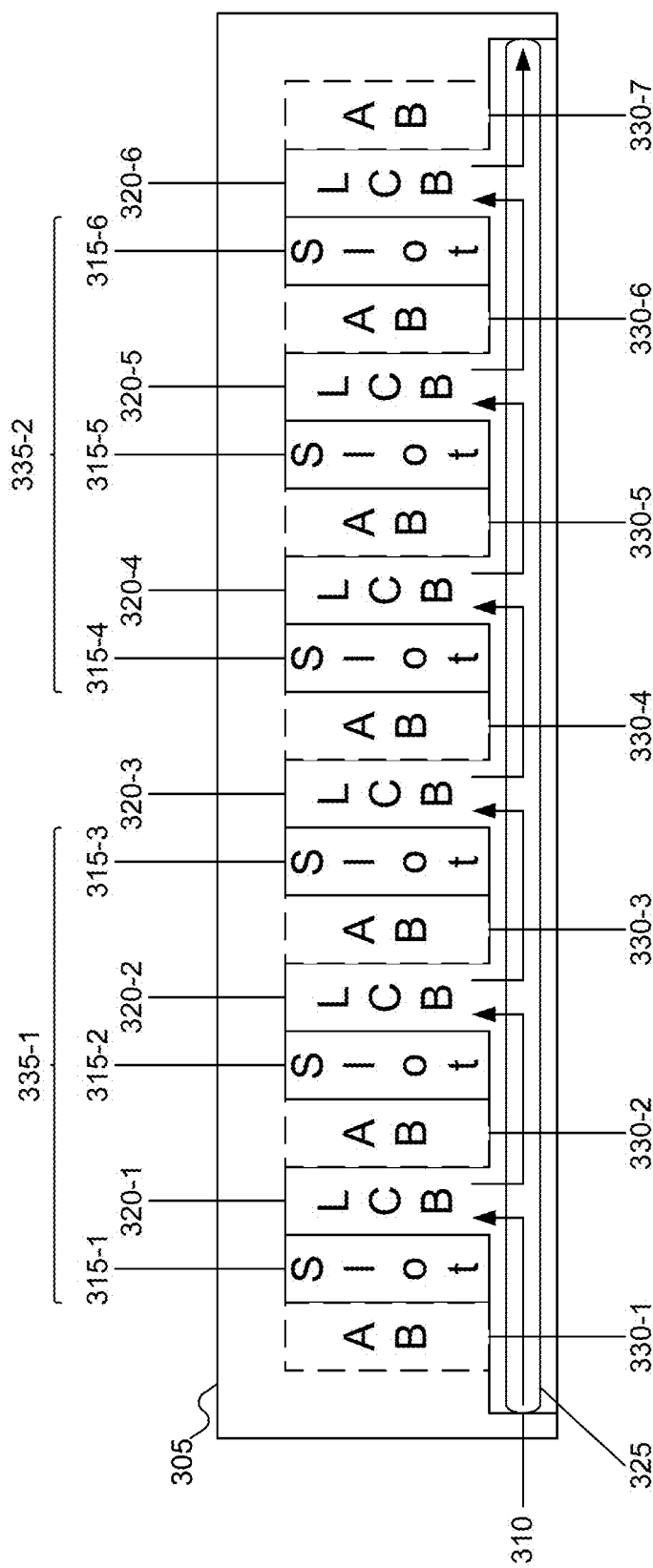
FIG. 3 shows a front view of a server chassis for the machine of FIG. 1, according to embodiments of the disclosure.

FIG. 3 shows a front view of a server chassis for machine 105 of FIG. 1, according to embodiments of the disclosure. In FIG. 3, chassis 305 is shown. Chassis 305 may include member 310, which may be, for example, a part of the front of chassis 305. Member 310 may be formed from any desired material: for example, member 310 may be made of metal.

Chassis 305 may also include various other elements. As shown in FIG. 3, chassis 305 may include slots 315-1 through 315-6, into which storage devices, such as storage device 120 of FIG. 1, may be inserted. Slots 315-1 through 315-6 may be referred to collectively as slots 315. Next to each slot 315-1 may be liquid cooling blocks 320-1 through 320-6. Liquid cooling blocks 320-1 through 320-6 may be referred to collectively as liquid cooling blocks 320. Liquid cooling blocks 320 may be designed with a block channel inside liquid cooling blocks 320, through which a liquid coolant may flow. This liquid coolant may be used to siphon off heat from storage devices 120 of FIG. 1 when placed in slots 315.

Any desired liquid coolant may be used. For example, the liquid coolant may be a glycol compound, such as ethylene glycol or propylene glycol. Other refrigerants may also be used, such as those used in refrigerators or air conditioning systems. In some embodiments of the disclosure, the coolant may be a fluid rather than a liquid.

To facilitate the flow of liquid coolant into liquid cooling blocks 320, member 310 may have system channel 325 within it or attached to it, which may provide a path for liquid coolant to flow. The liquid coolant may flow through system channel 325 into liquid cooling blocks 320. More specifically, as shown by the arrows, liquid coolant may flow through system channel 325 starting at the left, enter liquid cooling block 320-1, exit liquid cooling block 305-1 and return to system channel 325, enter liquid cooling block 320-2, exit liquid cooling block 305-2 and return to system channel 325, and so on until the liquid coolant has flowed through traveled through every liquid cooling block 320. The liquid coolant may then flow to a heat dissipator, which may remove heat from the liquid coolant, and then be pumped back into system channel 325 to repeat the cycle.

In some embodiments of the disclosure, member 310 and liquid cooling blocks 320 may be formed as a single piece. By being formed as a single piece, manufacturing costs may be reduced, and use of the liquid coolant may be simplified. In addition, the risk of a leak may be reduced (as leaks may be more likely to develop where two pieces meet). For example, member 310 and liquid cooling blocks 320 may be formed using three dimensional printing technology. In other embodiments of the disclosure, member 310 and liquid cooling blocks 320 may each be separate pieces, and/or may each be made up of two or more pieces. For example, member 310 and liquid cooling blocks 320 may be made of two pieces of material with system channel 325 and block channels carved between the pieces, with the pieces of material appropriately bonded together (for example, glue or welds). Member 325 and liquid cooling blocks 320 may be made of any desired material. Typically, member 310 and/or liquid cooling blocks 320 may be made of thermally conductive material, so that any heat generated around them may be conducted into the liquid coolant.

Where member 310 and liquid cooling blocks 320 are separate pieces, member 310 and liquid cooling blocks 320 may have parts that may interconnect to provide for the continuous flow of liquid coolant. For example, liquid cooling blocks 320 may have connectors that extend away from liquid cooling blocks 320, which may connect with recesses in member 310: through these connections the liquid coolant may flow between member 310 and liquid cooling blocks 320. Embodiments of the disclosure may include any mechanism for connecting member 310 and liquid cooling blocks 320: either member 310 or liquid cooling blocks 320 may have male or female connectors, or may be connected using adaptors of any desired form.

In some embodiments of the disclosure, liquid cooling blocks 320 may be positioned sufficiently closely to slots 315 so that liquid cooling blocks 320 may be in thermal contact with storage devices 120 of FIG. 1 that are installed in slots 315. If liquid cooling blocks 320 may be in thermal contact with storage devices 120 of FIG. 1 installed in slots 315 without using any thermal interface (such as a thermal paste, a pad, etc.), embodiments of the disclosure may facilitate easy replacement of storage devices 120 of FIG. 1 in slots 315 when needed (for example, when hot swapping storage devices 120 of FIG. 1). But in some embodiments of the disclosure, liquid cooling blocks 320 may use some sort of thermal interface to assist in removing heat from storage devices 120 of FIG. 1, albeit at the potential cost of making it more difficult to replace storage devices 120 of FIG. 1 when installed in slots 315.

While FIG. 3 shows member 310 as only covering part of the front of chassis 305, embodiments of the disclosure may have member 310 represent the entire front of chassis 305. That is, slots 315 may be slots in member 310 into which storage devices 120 of FIG. 1 may be installed.

While it may be possible to use a liquid cooling system to cool all components within chassis 305, embodiments of the disclosure may continue to use air cooling systems to dissipate heat from other components within chassis 305. But since air cooling systems may depend on it being possible to pull air through chassis 305, chassis 305 may have air bypasses 330-1 through 330-7. Air bypasses 330-1 through 330-7 may be referred to collectively as air bypasses 330. Air bypasses 330 may provide openings in the front of chassis 305 through which air may be drawn, facilitating the air cooling of other components within chassis 305. To represent the idea that air bypasses 330 are openings through which air may be drawn, air bypasses 330 are shown with dashed lines. (In a sense, slots 315 could also be represented using dashed lines, since slots 315 represent openings in the front of chassis 305 into which storage devices 120 of FIG. 1 may be installed. By since it may be expected that slots 315 will be filled with storage devices 120 of FIG. 1, slots 315 may be expected to be occupied, which explains the depiction using solid lines. Air bypasses 330, on the other hand, are intended to be left open to provide for air to enter chassis 305 for air cooling of other components.)

In some embodiments of the disclosure, storage devices 120 of FIG. 1 might have two sides, one of which generates relatively little heat and the other generating relatively more heat. For example, if storage devices 120 of FIG. 1 are SSDs, flash memory chips and RAM chips tend to use relatively little power and generate relatively little heat, while the controller for the SSD and a computational storage unit in the SSD might use relatively more power and generate relatively more heat. In such embodiments of the disclosure, storage devices 120 of FIG. 1 may be arranged so that the components that generate more heat are on one side of storage devices 120 of FIG. 1, and liquid cooling blocks 320 may be arranged so as to thermally conduct away heat from the side of storage devices 120 of FIG. 1 that generate more heat, thereby increasing the effectiveness of the liquid cooling system. The side of storage devices 120 of FIG. 1 that generates less heat may thus be next to air bypasses 330.

In other embodiments of the disclosure, storage devices 120 of FIG. 1 might generate roughly equal amounts of heat on both side. In some embodiments of the disclosure, air bypasses 330 might provide sufficient cooling for the sides of storage devices 120 of FIG. 1 exposed to air bypasses 330 (that is, the sides of storage devices 120 of FIG. 1 not in thermal contact with liquid cooling blocks 320). In other embodiments of the disclosure, chassis 305 (and member 310, slots 315, and liquid cooling blocks 320) may be designed so that liquid cooling blocks may be present against both sides of such storage devices 120 of FIG. 1. In such embodiments of the disclosure, air bypasses 330 may be repositioned: for example, along the top of chassis 305 (where storage devices 120 of FIG. 1 would be absent), on the outside of all slots 315 and liquid cooling blocks 320, or between liquid cooling blocks 320.

Slots 315 may be organized into zones. For example, slots 315-1 through 315-3 are shown as forming zone 335-1, and slots 315-4 through 315-6 are shown as forming zone 335-2. Zones 335-1 and 335-2 (which may be referred to collectively as zones 335) may represent groups of slots that may have a particular cooling allocation (which may also be called a cooling budget) assigned to them. Further, storage devices 120 in slots 315 may request that the cooling allocation for the zone including the individual storage devices 120 may be adjusted (either increased or decreased, depending on the circumstances).

While FIG. 3 shows two zones, each including three slots 315, embodiments of the disclosure may include any number (zero or more) of zones, each with any number (one or more) of slots 315. In theory, each slot 315 could be its own zone. In addition, while FIG. 3 suggests that zones 335 are formed from sets of slots 315 that are all adjacent, embodiments of the disclosure may include zones that are disconnected. For example, if slots 315 are numbered from zero to 23 (assuming a total of 24 slots 315), zone 335-1 might include slots 315 with even numbers, and zone 335-2 might include slots 315 with odd numbers. Embodiments of the disclosure may extend to any desired method of dividing slots 315 into zones 335.

The liquid cooling system may have some total cooling capacity. This cooling capacity may be based on, for example, the efficiency of the system that removes heat from the liquid coolant (for example, the speed of fans that blow across a radiator to dissipate heat), the speed of the pump that circulates the liquid coolant, how efficiently the liquid coolant absorbs and releases heat, and other factors. In general, there may be a relationship between the cooling capacity of the liquid cooling system and the power consumed by devices that generate heat to be removed using the liquid cooling system (although the formula that may express this relationship may be complicated). For example, a particular liquid cooling system, considering all appropriate factors, may have the ability to dissipate the heat generated by devices equivalent to using 100 W of power, and may offer greater thermal dissipation than air-cooled systems.

Each zone 335 may be assigned a cooling allocation. A cooling allocation may be thought of as a share of the total available cooling supported by the liquid cooling system. For example, if the liquid cooling system is able to dissipate the heat generated using 100 W of power by various storage devices, each zone 335 of FIG. 3 may be allocated a percentage of this cooling capacity: for example, 30 W of cooling, or 30% of the total available cooling capacity of the liquid cooling system.

Note that zones 335 may have different cooling capacities—that is, each zone 335 may have different a different cooling allocation. For example, zone 335-1 might be assigned a cooling allocation of 40% of the cooling capacity of the liquid cooling system, while zone 335-2 might be assigned a cooling allocation of 25% of the cooling capacity of the liquid cooling system. Also, note that the sum of the cooling allocations for zones 335 may be less than the total cooling capacity of the liquid cooling system. Any unused cooling capacity may be thought of as additional cooling capacity of the liquid cooling system. (In some embodiments of the disclosure, the liquid cooling system may be limited to operating at 100% of its total cooling capacity; in other embodiments of the disclosure, the liquid cooling system may be capable of exceeding its total cooling capacity for relatively short periods of time (but at the risk of equipment failure, similar to how overclocking a processor or running an engine past the redline may be possible but not recommended).

The reason that the liquid cooling system might not be operating at maximum cooling capacity might be because the total cooling capacity of the liquid cooling system may be more than is needed to dissipate the heat generated by storage devices 120 of FIG. 1. For example, if storage devices 120 of FIG. 1 are using 40 W of power each (for example, using computational resources in storage devices 120 of FIG. 1), liquid cooling system may need to dissipate more heat than if storage devices 120 of FIG. 1 are using 1 W of power each (for example, when storage devices 120 of FIG. 1 are essentially idle). In other words, the liquid cooling system may adjust its performance to address the heat generated by storage devices 120 of FIG. 1, rather than operating at full capacity at all times. (In fact, operating at full capacity at all times might, under some circumstances, be detrimental to system 105 of FIG. 1, as the liquid cooling system might bring the operating temperature of one or more storage devices 120 of FIG. 1 below their specifications.)

As described above, the liquid coolant may flow through liquid cooling blocks 320 serially. It may thus be expected that the liquid coolant may be cooler (able to absorb more heat) at the start of the sequence (for example, when flowing through liquid cooling block 320-1 adjacent to slot 315-1) than at the end of the sequence (for example, when flowing through liquid cooling block 320-6 adjacent to slot 315-6). The cooling allocations assigned to zones 335 may be thought of as an expected amount of cooling offered by the liquid cooling system, rather than a promise that that amount of heat may be removed from storage devices 120 of FIG. 1 in zones 335. But note that pump speed may be a factor. For example, to increase cooling to zone 335-2, the pump speed may be increased, so that the liquid coolant flows faster past liquid cooling blocks 320-1 through 320-3, which may mean that the liquid coolant has more ability to remove heat using liquid cooling blocks 320-4 through 320-6.

While FIG. 3 shows various numbers of elements—six slots 315, six liquid cooling blocks 320, and seven air bypasses 330—embodiments of the disclosure may include any number of these elements. Nor are the numbers of these elements necessarily related each other. For example, there might be only one or two air bypasses 330, if sufficient air is thereby available for air cooling components inside chassis 305. Or each liquid cooling block 320 might support cooling of multiple storage devices 120 of FIG. 1 in slots 315, in which case there might be more slots 315 than liquid cooling blocks 320.

Figure 4A:
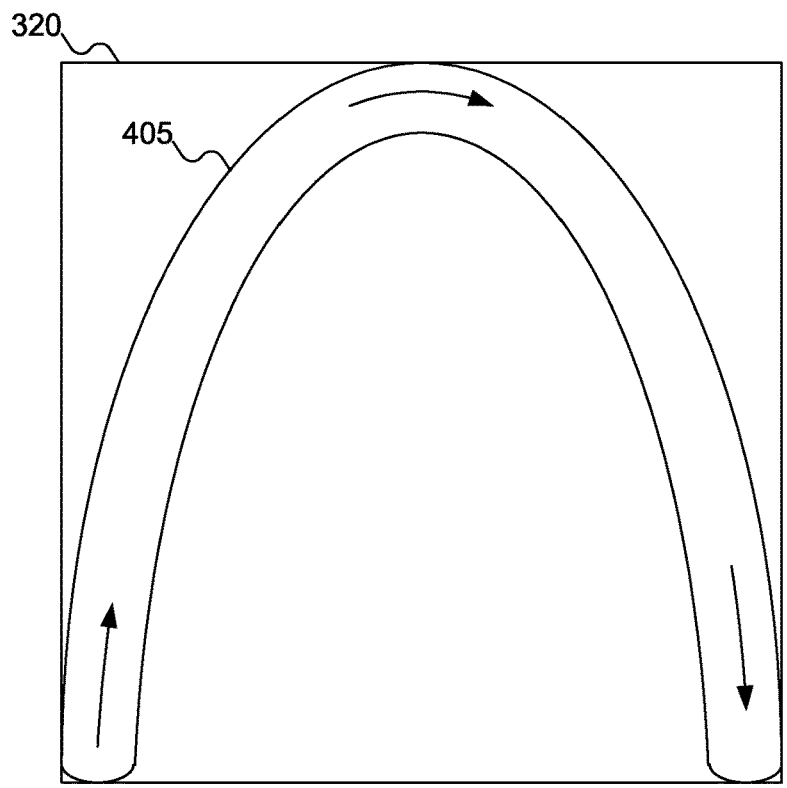
FIG. 4A shows a cross section side view of an example liquid cooling block of FIG. 3, according to embodiments of the disclosure.

FIG. 4A shows a cross section of a side view of an example liquid cooling block 320 of FIG. 3, according to embodiments of the disclosure. In FIG. 4A, liquid cooling block 320 may have block channel 405, in which the liquid coolant may flow. The liquid coolant may enter block channel 405 from system channel 325 of FIG. 3, and may return to system channel 325 of FIG. 3 upon exiting block channel 405. As it flows in block channel 405, the liquid coolant may absorb some of the heat from storage devices 120 of FIG. 1 that are in thermal contact with liquid cooling block 320, thereby cooling storage devices 120 of FIG. 1.

Figure 4B:
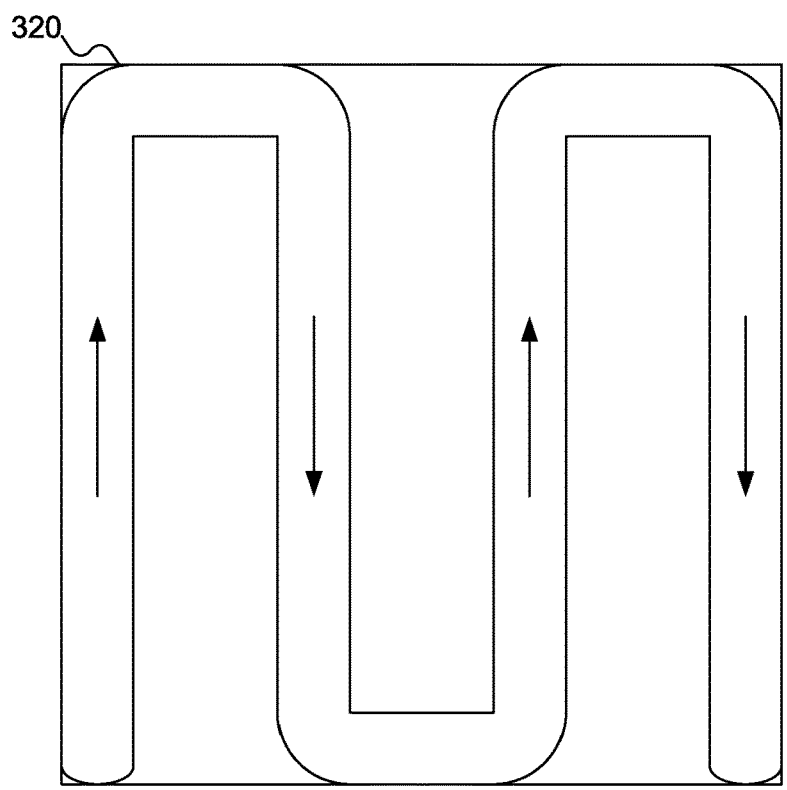
FIG. 4B shows an alternative cross section side view of an example liquid cooling block of FIG. 3, according to embodiments of the disclosure.

While FIG. 4A shows one cross section of a side view of an example liquid cooling block 320 of FIG. 3, block channels 405 are also possible. FIG. 4B shows an alternative cross section of a side view of an example liquid cooling block 320 of FIG. 320 of FIG. 3. In FIG. 4B, block channel 405 may be more "squared off", make "snake" around inside liquid cooling block 320 more, and may expose more liquid coolant to surface area with the side of liquid cooling block 320 (thereby absorbing more heat).

Block channel 405 may take any desired shape. The widths of block channel 405, the pattern taken by block channel 405 as it snakes through liquid cooling block 320, the squareness of the corners, etc. may all be varied within embodiments of the disclosure.

Figure 5:
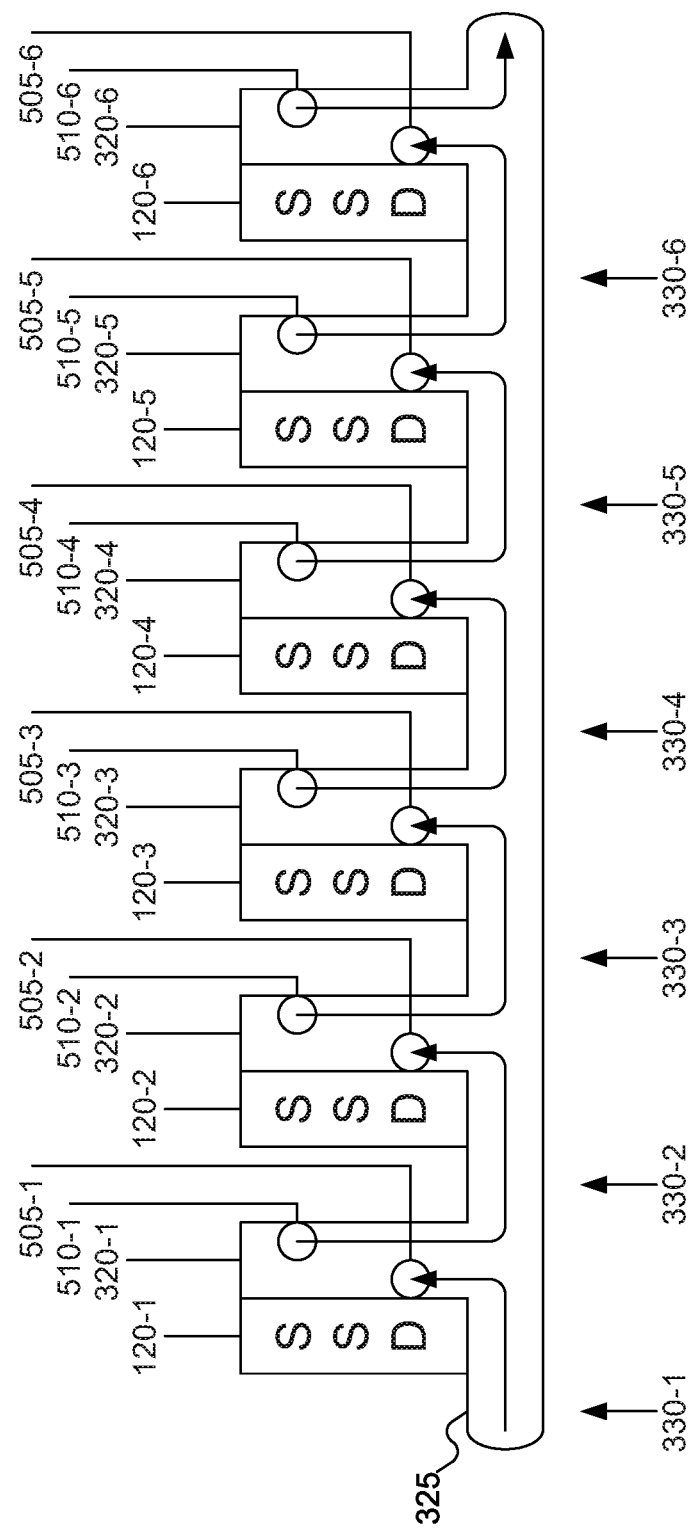
FIG. 5 shows a top view of the path taken by liquid coolant in the machine of FIG. 1, according to embodiments of the disclosure.

FIG. 5 shows a top view of the path taken by liquid coolant in machine 105 of FIG. 1, according to embodiments of the disclosure. In FIG. 5, liquid coolant may enter system channel 325 from the left. Liquid coolant may then flow from system channel 325 into liquid cooling block 320-1 (which, in embodiments using liquid cooling blocks 320 of FIGS. 4A-4B, may enter and exit from the bottom of liquid cooling block 320-1) and return to system channel 325. The liquid coolant may then flow along system channel 325 into liquid cooling block 320-2, and so on until the liquid coolant exits liquid cooling block 320-6, after which the liquid coolant may return to system channel 325 and travel to where the absorbed heat may be dissipated.

In embodiments of the disclosure where member 310 of FIG. 3 and liquid cooling blocks 320 are not formed as a single piece, member 310 of FIG. 3 and liquid cooling blocks 320 may be connected using connectors 505-1 through 505-6 and 510-1 through 510-6 (which may be referred to collectively as connectors 505 and connectors 510). Connectors 505 may be connectors through which the liquid coolant may flow into liquid cooling blocks 320 from system channel 325, and connectors 510 may be connectors through which the liquid coolant may flow out of liquid cooling blocks 320 into system channel 325. But while FIG. 5 shows connectors 505 and 510 as being on the bottom of liquid cooling blocks 320, embodiments of the disclosure may include connectors 505 and 510 on any sides of liquid cooling blocks 320, and may be on different sides of liquid cooling blocks 320 as well.

Adjacent to each liquid cooling block 320 may be storage devices 120-1 through 120-6 (shown in FIG. 5 as SSDs, although embodiments of the disclosure may use other storage devices). As discussed above, storage devices 120 may have one side on which the components that generate heat are arranged (or mostly arranged): this side of storage devices 120 may be in thermal contact with liquid cooling blocks 320: in some embodiments of the disclosure, there may be a thermal interface between storage devices 120 and liquid cooling blocks 320.

In FIG. 5, air bypasses 330 are also shown. Rather than depicting air bypasses 330 with a structure, in FIG. 5 air bypasses 330 are shown as negative space through which air may flow. The air that may flow through air bypasses 330 thus may be used to cool other components of machine 105 of FIG. 1.

Figure 6:
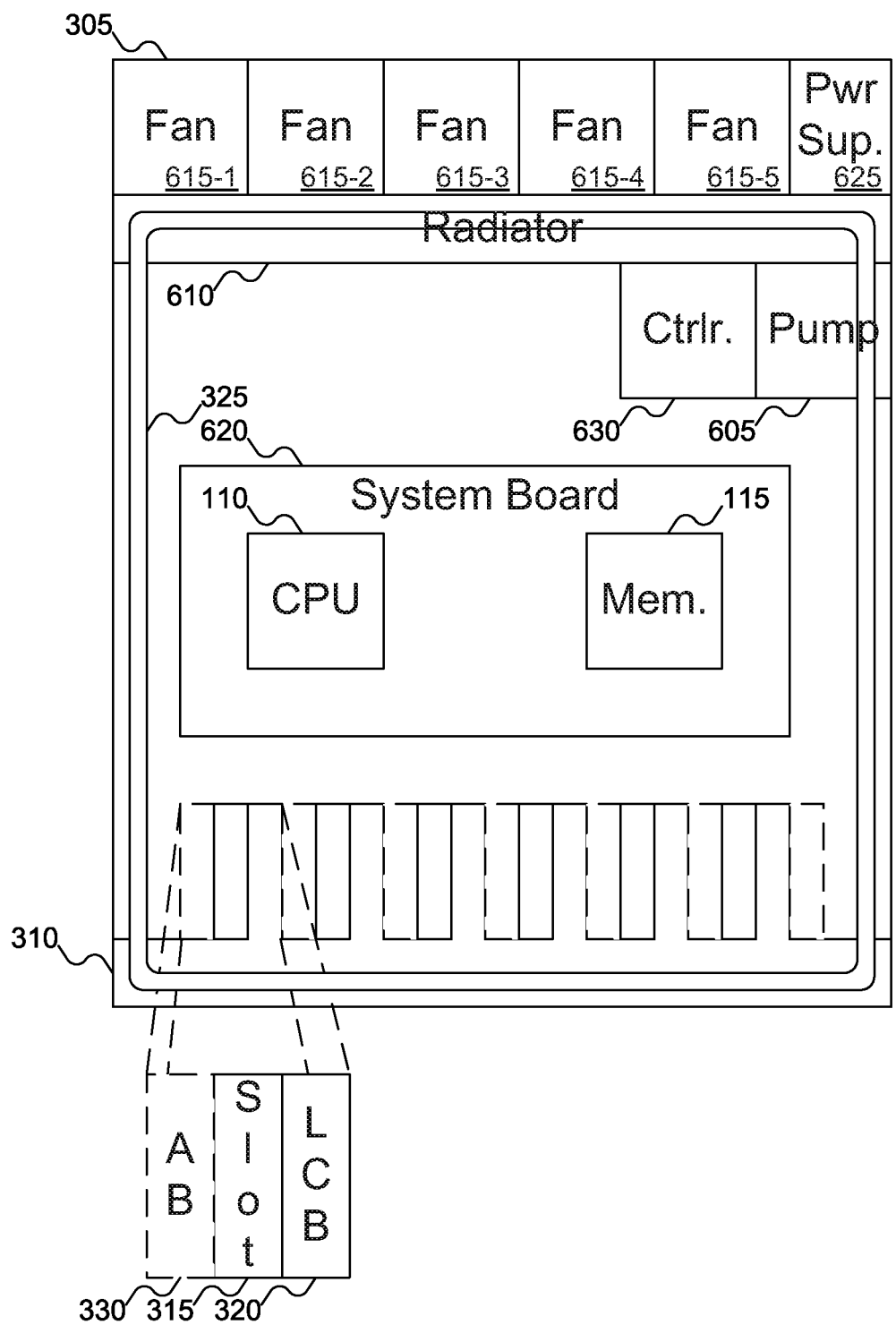
FIG. 6 shows a top view of the server chassis of FIG. 3, according to embodiments of the disclosure.

FIG. 6 shows a top view of server chassis 305 of FIG. 3, according to embodiments of the disclosure. As may be seen, air bypasses 330, slots 315, and liquid cooling blocks 320 may be arranged as shown in FIG. 3, with system channel 325 providing a path to bring liquid coolant to and from liquid cooling blocks 320.

System channel 325 may continue toward the back of chassis 305, where pump 605 may circulate the liquid coolant through system channel 325. In addition, system channel 325 may connect to radiator 610. Radiator 610 may be used to dissipate heat collected by the liquid coolant, thereby enabling the (now cooled) liquid coolant to return to liquid cooling blocks 320 via system channel 325. Radiator 610 may use a large surface area to expose the liquid coolant to air moved by fans 615-1 through 615-5 (which may be referred to collectively as fans 615), which may draw off heat from liquid coolant. Note that fans 615 may be part of the air cooling system of chassis 305, which may be used to remove heat from system board 620, processor 110, memory 115, and any other components within chassis 305. Fans 615, system board 620, processor 110, memory 115, and pump 605 (among other components) may be powered by power supply 625.

While the above description focuses on radiator 610 as being an air cooled system to remove heat from the liquid coolant, embodiments of the disclosure may include alternative mechanisms for removing heat from the liquid coolant. Embodiments of the disclosure may include any variety of heat exchanger to remove heat from the liquid coolant for later dissipation. For example, a liquid-to-liquid heat exchanger may be used to remove heat from the liquid coolant, with the heat drawn into the second liquid dissipated in any desired manner. Or, radiator 610 may be replaced with an appropriate compressor to remove heat from the liquid coolant. Or, radiator may be replaced with a rack- or datacenter-level heat exchanger (and may be located outside chassis 305 rather than inside chassis 305 as shown in FIG. 6).

As described with reference to FIG. 3 above, storage devices 120 of FIG. 1 may be assigned to different zones 335 of FIG. 3, each zone 335 may be assigned a cooling allocation, and the liquid cooling system may adjust its performance to satisfy the cooling requirements of system 105 of FIG. 1. In some embodiments of the disclosure, storage devices 120 of FIG. 1, slots 315, or liquid cooling blocks 320 may have sensors capable of determining how hot storage devices 120 of FIG. 1 are, and may provide this information to controller 630. Controller 630 may then adjust the speed of pump 605 to increase or decrease the circulation of the liquid coolant. If heat is dissipated from the liquid coolant using radiator 610 and fans 615, then controller 630 may also adjust the speed of fans 615 to increase the air speed across radiator 610 to remove additional heat. If heat is dissipated from the liquid coolant using a heat exchanger that is outside chassis 305, then controller 630 may send a signal to the heat exchanger, informing the heat exchanger to increase or decrease heat dissipation as needed.

In other embodiments of the disclosure, storage devices 120 of FIG. 1 may determine when additional heat is expected to be generated. For example, if storage device 120 of FIG. 1 is currently idle but starts to receive numerous I/O requests from processor 110, or if storage device 120 of FIG. 1 receives a request to start processing using a computational resource, storage device 120 of FIG. 1 may expect that it will use more power and inform controller 630 of a need for increased cooling. Similarly, when storage device 120 of FIG. 1 completes its operations and expects to be using less power, storage device 120 of FIG. 1 may inform controller 635 of less need for cooling. Controller 630 may then adjust how heat is removed from storage devices 120 of FIG. 1 and dissipated accordingly.

Controller 630 may be any desired controller for the liquid cooling system. As an example, since controller 630 may receive messages from storage devices 120 of FIG. 1 (or from sensors attached to storage devices 120 of FIG. 1, slots 315, or liquid cooling blocks 320), controller 630 may be a baseboard management controller.

When storage devices 120 of FIG. 1 send a request for an increased cooling allocation, controller 630 may determine which zone storage device 120 of FIG. 1 is in (based, for example, on how zones 335 of FIG. 3 are defined and the slot 315 in which storage device 120 of FIG. 1 that sent the request is located). Controller 630 may then determine if there is additional cooling capacity available to be allocated to that zone 335 of FIG. 3. If there is additional cooling capacity, controller 630 may increase the cooling allocation for that zone 335 of FIG. 3. If not, controller 630 may determine if the cooling allocation of one or more other zones 335 of FIG. 3 may be decreased, to allow for an increased cooling allocation for the zone requesting the increase. If so, controller 630 may make the appropriate changes to achieve the target result. Controller 630 may also inform storage devices 120 of FIG. 1 installed in slots 315 of what changes are made to individual cooling allocations for zones 335 of FIG. 3, as well as what additional cooling capacity may exist for the liquid cooling system.

Figure 7:
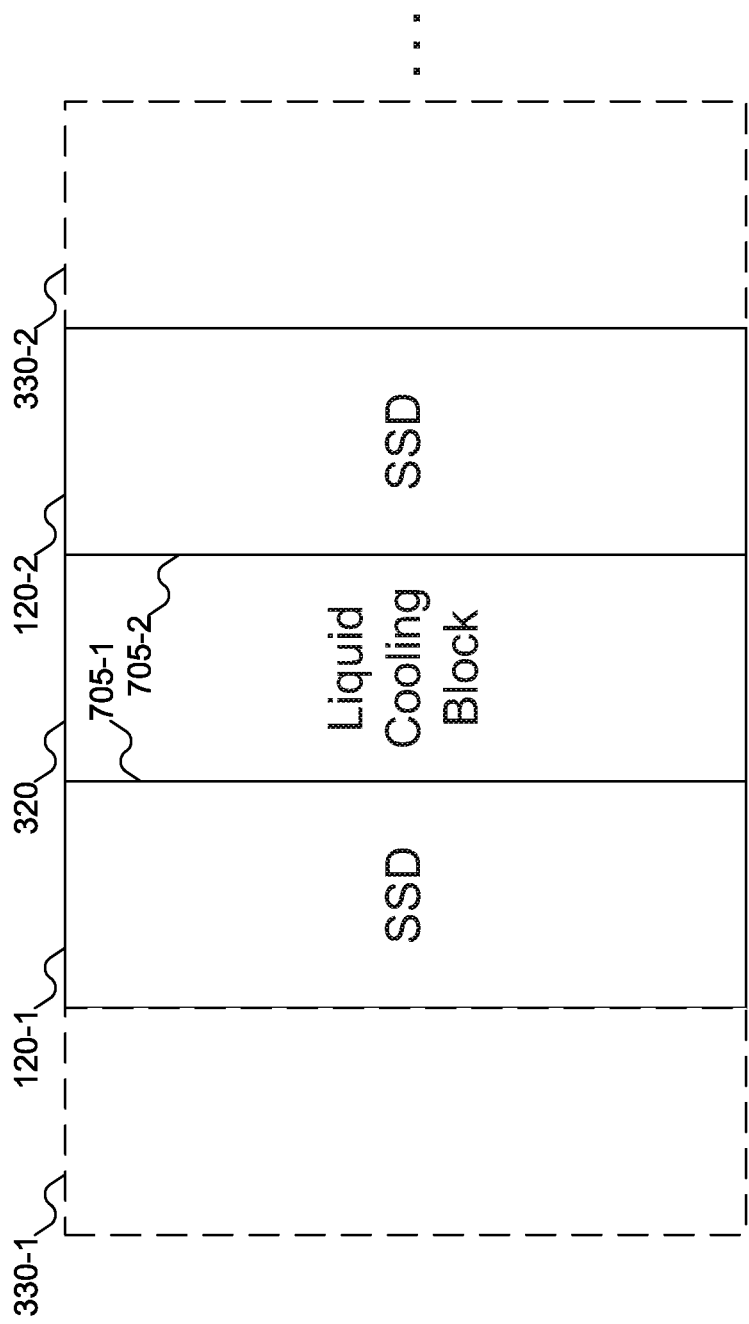
FIG. 7 shows another arrangement of the air bypasses, slots, and liquid cooling blocks of FIG. 3, according to embodiments of the disclosure.

FIG. 7 shows another arrangement of air bypasses 330 of FIG. 3, slots 315 of FIG. 3, and liquid cooling blocks 320 of FIG. 3, according to embodiments of the disclosure. In FIG. 7, liquid cooling block 320 may have sides 705-1 and 705-2. Side 705-1 may be in thermal contact with one side of SSD 120-1 (which may be in slot 315-1 of FIG. 3), and side 705-2 may be in thermal contact with one side of SSD 120-2 (which may be in slot 315-2 of FIG. 3). In this manner, one liquid cooling block 320 may provide for liquid cooling of two storage devices 120 of FIG. 1 in both slots 315-1 and 315-2 of FIG. 3.

Note that in FIG. 7, liquid cooling block 320 may be adjacent to different sides of SSDs 120-1 and 120-2 in slots 315-1 and 315-2 of FIG. 3. If storage devices 120 may generate heat on both sides, then this arrangement may provide for some cooling of storage devices 120 when installed in slots 315-1 and 315-2 of FIG. 3 (with air bypasses 330-1 and 330-2 providing for air cooling of the other sides of storage devices 120). But if storage devices 120 may radiate significantly more heat from one side than from the other side, then it may be desirable for one of slots 315-1 or 315-2 of FIG. 3 to be reversed, so that the sides of SSDs 120-1 and 120-2 radiating more heat may be cooled by liquid cooling block 320. For example, the connection between storage device 120-2 and slot 315-2 of FIG. 3 may be rotated 180 degrees relative to the connection in SSD 120-1 and slot 315-1 of FIG. 3, so that the sides of storage devices 120 that radiate more heat may be in thermal contact with liquid cooling block 320.

While FIG. 7 shows one arrangement to use both sides 705 of liquid cooling block 320 to remove heat from storage devices 120 in slots 315 of FIG. 3 (as compared with FIG. 3), embodiments of the disclosure may support other arrangements of air bypasses 330, slots 315 of FIG. 3, and liquid cooling blocks 320.

Figure 8:
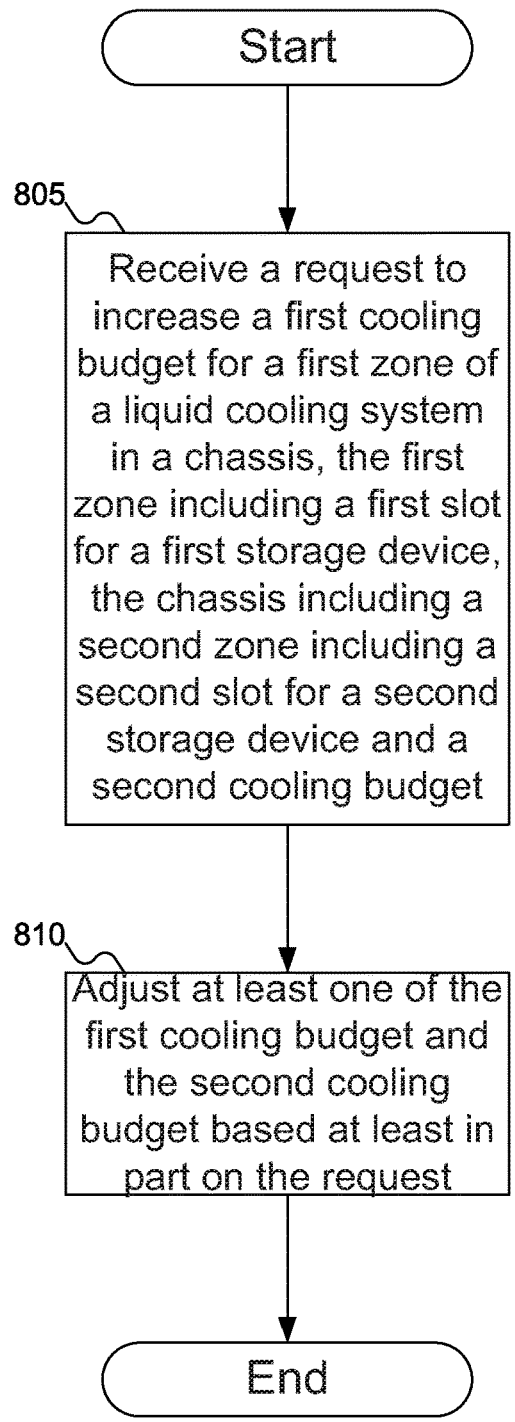
FIG. 8 shows a flowchart of an example procedure for processing a request to increase a cooling allocation for a zone of storage devices in the server chassis of FIG. 3, according to embodiments of the disclosure.

FIG. 8 shows a flowchart of an example procedure for processing a request to increase a cooling allocation for zone 335-1 of FIG. 3 of storage devices 120 of FIG. 3 in server chassis 305 of FIG. 3, according to embodiments of the disclosure. In FIG. 8, at block 805, the liquid cooling system (and more particularly controller 630 of FIG. 6) may receive a request to increase a cooling allocation for zone 335-1 of FIG. 3 (or perhaps from storage device 120 of FIG. 1 installed in slot 315 of FIG. 3 in zone 335-1 of FIG. 3). This zone 335-1 of FIG. 3 may have slot 315 of FIG. 3 for storage device 120 of FIG. 1. Server chassis 305 of FIG. 3 may also have another zone 335-2 of FIG. 3, which may have its own cooling allocation and its own slot 315 of FIG. 3 for storage device 120 of FIG. 1. At block 810, controller 630 may adjust one or more of the cooling allocations for zones 335-1 or 335-2 of FIG. 3 as a response to the request.

Figure 9A:
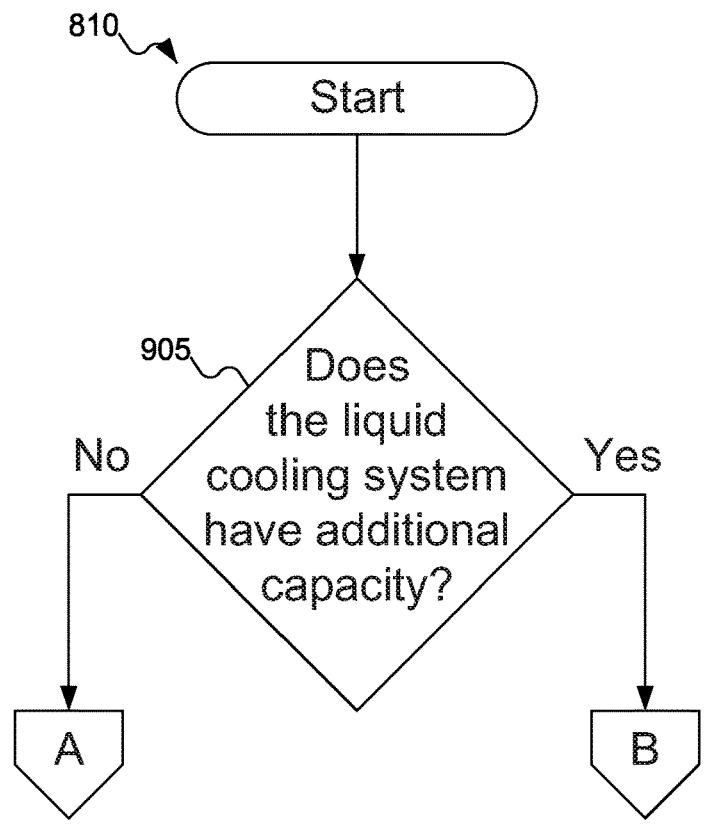
FIG. 9A shows a flowchart of an example procedure for adjusting the cooling allocation for a zone of storage devices in the server chassis of FIG. 3, according to embodiments of the disclosure.
Figure 9B:
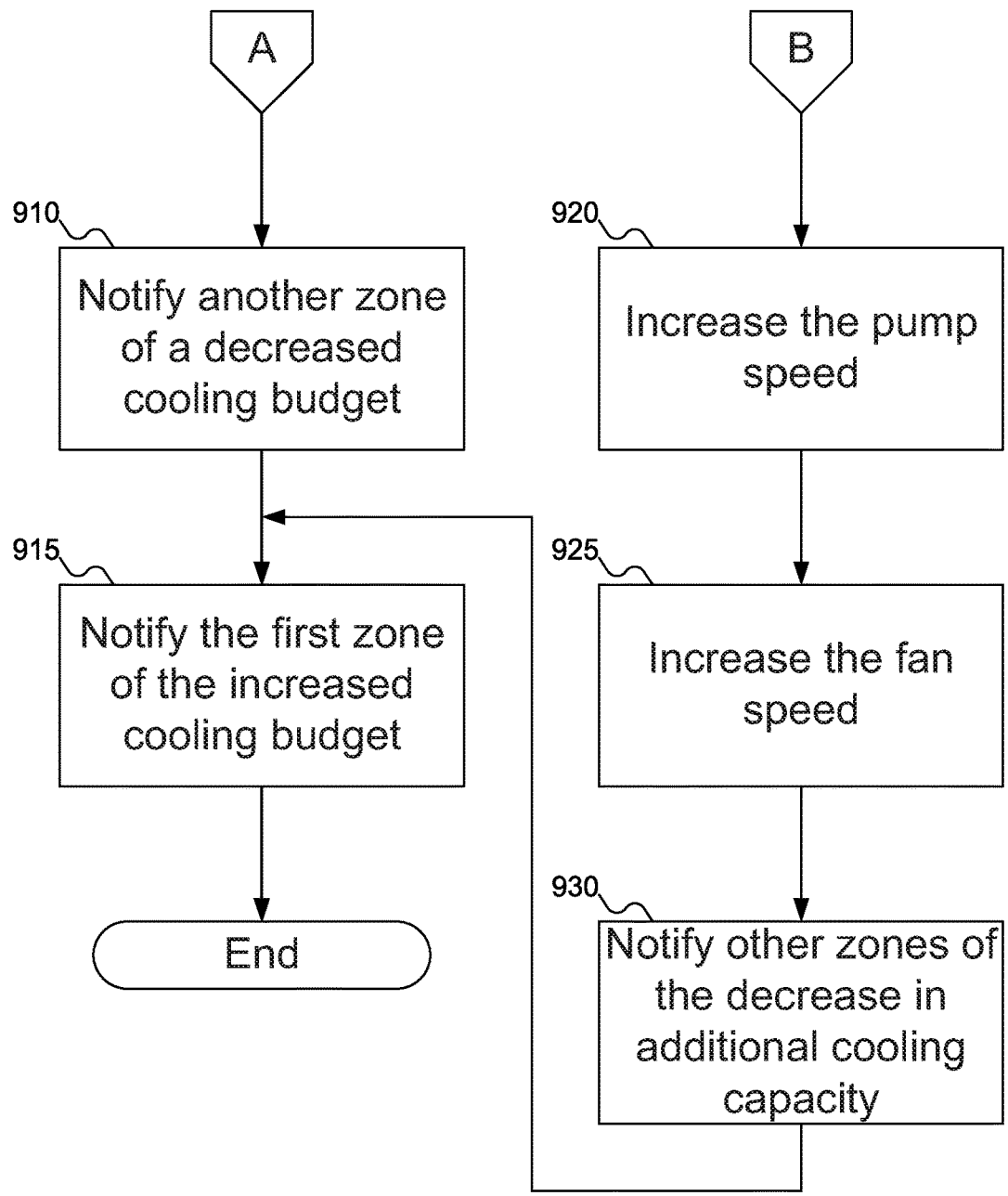
FIG. 9B continues the flowchart of FIG. 9A an example procedure for adjusting the cooling allocation for a zone of storage devices in the server chassis of FIG. 3, according to embodiments of the disclosure.

FIGS. 9A-9B show a flowchart of an example procedure for adjusting the cooling allocation for zone 335 of storage devices 120 of FIG. 1 in server chassis 305 of FIG. 3, according to embodiments of the disclosure. In FIG. 9, at block 905, controller 630 of FIG. 6 may determine if the liquid cooling system has any additional cooling capacity. If not, then at block 910 (FIG. 9B), controller 630 may select another zone 335-2 of FIG. 3 to decrease its cooling allocation, and may notify that zone 335-2 of FIG. 3 of its reduced cooling allocation. Then, at block 915, controller 630 of FIG. 6 may notify zone 335-1 of FIG. 3 (which issued the request) that its cooling allocation has been increased.

On the other hand, if the liquid cooling system has additional cooling capacity, then at block 920, controller 630 of FIG. 6 may increase the speed of pump 605 of FIG. 6, and at block 925, controller 630 of FIG. 6 may increase the speed of fans 615 of FIG. 6. Note that whether the pump speed, the fan speed, or some other action is taken to support the increased cooling allocation of zone 335-1 of FIG. 3 may be a function of how the liquid cooling system is implemented, and blocks 920 and 925 may be modified as appropriate to the implementation of the liquid cooling system. Further, depending on the circumstances, one or both of blocks 920 and 925 might be unnecessary. For example, just increasing the speed of pump 605 of FIG. 6 may be sufficient to provide for the increased cooling allocation, or even at minimal settings the liquid cooling system might have sufficient cooling capacity that no changes to the operation of the liquid cooling system are needed. At block 930, controller 630 of FIG. 6 may notify zones 335 of FIG. 3 of the decrease in the additional cooling capacity. Control may then continue at block 915, where controller 630 of FIG. 6 may notify zone 335-1 of FIG. 3 that its cooling allocation has been increased.

Note that absent from FIGS. 9A-9B is any handling of the situation where there is no additional cooling capacity available, nor may any additional cooling capacity be obtained (for example, by decreasing the cooling allocation of another zone 335 of FIG. 3). In such situations, controller 630 of FIG. 6 may notify zone 335-1 of FIG. 3 that no increase in its cooling allocation is possible, and zone 335-1 of FIG. 3 may manage without the increased cooling allocation. Such management may involve, for example, refusing requests that may involve increased power consumption (with the resultant heat generation), or accepting that storage devices 120 of FIG. 1 may be throttled (internally or externally) to address the increased heat generation.

Figure 10:
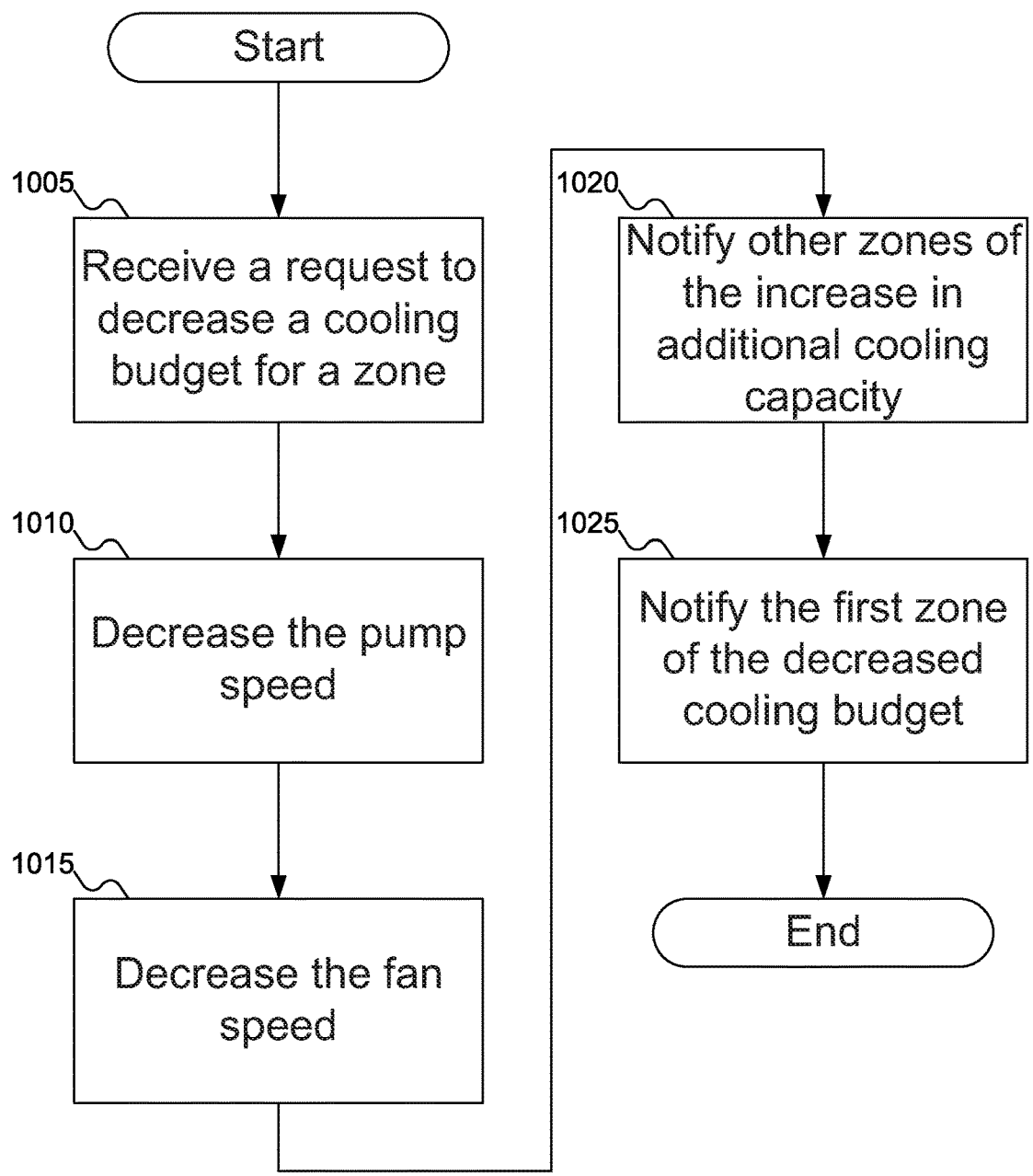
FIG. 10 shows a flowchart of another example procedure for adjusting the cooling allocation for a zone of storage devices in the server chassis of FIG. 3, according to embodiments of the disclosure.

FIG. 10 shows a flowchart of another example procedure for adjusting the cooling allocation for zone 335-1 of FIG. 3 of storage devices 120 of FIG. 1 in server chassis 305 of FIG. 3, according to embodiments of the disclosure. In FIG. 10, at block 1005, controller 630 of FIG. 6 may receive a request to decrease the cooling allocation for zone 335-1 of FIG. 3. At block 1010, controller 630 of FIG. 6 may reduce the speed of pump 605 of FIG. 6, and at block 1015 controller 630 of FIG. 6 reduce the speed of fans 615 of FIG. 6. Note that whether the pump speed, the fan speed, or some other action is taken to support the decreased cooling allocation of zone 335-1 of FIG. 3 may be a function of how the liquid cooling system is implemented, and blocks 920 and 925 may be modified as appropriate to the implementation of the liquid cooling system. Further, depending on the circumstances, one or both of blocks 920 and 925 might be unnecessary. For example, if fans 615 of FIG. 6 are at a higher speed to provide sufficient cooling for processor 110 of FIG. 1, controller 630 of FIG. 6 might leave the speed of fans 615 of FIG. 6 unchanged, or if pump 605 of FIG. 6 and fans 615 of FIG. 6 are already operating at minimum settings, controller 630 of FIG. 6 might make no changes even with the decreased cooling allocation for zone 335-1 of FIG. 3. At block 1020, controller 630 of FIG. 6 may notify zones 335 of FIG. 3 of the increase in the additional cooling capacity. Finally, at block 1025, controller 630 of FIG. 6 may notify zone 335-1 of FIG. 3 that its cooling allocation has been decreased.

In FIGS. 8-10, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include an chassis with a liquid cooling system. The liquid cooling system may include liquid cooling blocks that may be used to remove heat from devices in slots adjacent to the liquid cooling blocks. In some embodiments of the disclosure, the liquid cooling blocks may be part of the chassis of the machine, and may be manufactured in as few pieces as possible (desirably, one piece) to reduce manufacturing cost and assembly expense, as well as a reduced risk of failure.

The liquid cooling system may also divide slots into zone. Each zone may have its own cooling allocation. Zones may request an increase in their cooling allocation, which may be satisfied if there is additional cooling capacity, or by decreasing the cooling allocation for another zone.

Thermal management may be an aspect of any information technology (IT) infrastructure component, and more so for technologies such as storage devices with attached computational resource. As performance demands from Solid State Drives (SSDs) and other storage devices grow, effective and efficient heat dissipation becomes more important to achieve desired performance levels.

Embodiments of the disclosure propose a liquid cooling method for a storage device with a computational resource.

Embodiments of the disclosure may include increased power allocations, improved controller functionality and performance, support for current and future technologies, such as Peripheral Component Interconnect Express (PCIe) 4.0 and above, support for computational storage, and addressing existing cooling issues.

In a system, the existing fins separating drives may be expanded slightly, and configured to make contact with the drives utilizing the backplane. The system may be fabricated in a few pieces to reduce fabrication costs and risk of leakage.

The SSD contact side may include a standard heat liquid block (an internal heat spreader mechanism). Empty spaces may be used for air bypass and plugging of devices.

Air may flow around the front panel containing the driver to cool other components as well as radiators. Air may bypass through this through holes in the liquid cooling front plane to cool the rest of the machine. These holes may be placed on the non-contact side, and may allow for liquid pass-through on the sides.

Storage devices cooled by embodiments of the disclosure may be divided into cooling zones. The zones may be scheduled for higher cooling utilization (and power utilization). Zones may be interspersed—for example, every other storage device—or separated—for example, in contiguous groups of storage devices, to provide for even division of the cooling block.

There are various options for exhausting the heat. The cooling liquid may be piped away from the server to rack- or datacenter-level heat exchangers. The cooling liquid may be piped to the back of server where a radiator may draw heat away without the heat soaking the other components, such as a central processing unit (CPU) or add-in cards (AICs).

Pump speeds may be modulated based on high power zone locations and/or thermal need. Fan speeds may be modulated by the need for CPU, AIC, or radiator cooling.

By using a single piece of metal with many slots, manufacturing may be simplified and costs reduced. These reduced costs may be passed on to customers, which may provide for a lower total cost of operation and may improve reliability.

Embodiments of the disclosure may provide for cooling of front place storage, and may allow for adequate cooling of other components by drawing away heat. Embodiments of the disclosure may permit higher a Thermal Design Power (TDP) for SSDs and computational resources.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a chassis, comprising:
- a member including a system channel for a liquid coolant to flow;
- a slot in the member for a storage device; and
- a liquid cooling block associated with the slot in the member, the liquid cooling block including a block channel for the liquid coolant to flow to remove heat from the storage device.

Statement 2. An embodiment of the disclosure includes the chassis according to statement 1, wherein the chassis is a server chassis.

Statement 3. An embodiment of the disclosure includes the chassis according to statement 1, wherein the storage device is at least one of a hard disk drive, a first Solid State Drive (SSD), a first computational storage unit, or a second SSD including a second computational storage unit.

Statement 4. An embodiment of the disclosure includes the chassis according to statement 1, wherein the block channel, the system channel, and a pump to circulate the liquid coolant form a continuous path for the liquid coolant.

Statement 5. An embodiment of the disclosure includes the chassis according to statement 1, wherein the liquid cooling block and the member form a single piece.

Statement 6. An embodiment of the disclosure includes the chassis according to statement 1, further comprising:
- a second slot in the member for a second storage device; and
- a second liquid cooling block associated with the second slot in the member, the second liquid cooling block including a second block channel for the liquid coolant to flow to remove heat from the second storage device.

Statement 7. An embodiment of the disclosure includes the chassis according to statement 6, wherein the block channel, the second block channel, the system channel, and a pump to circulate the liquid coolant form a continuous path for the liquid coolant.

Statement 8. An embodiment of the disclosure includes the chassis according to statement 6, wherein:
- the block channel, the system channel, and a pump to circulate the liquid coolant form a first continuous path for the liquid coolant; and
- the second block channel, a second system channel for the liquid coolant to flow, and the pump to circulate the liquid coolant form a second continuous path for the liquid coolant.

Statement 9. An embodiment of the disclosure includes the chassis according to statement 8, wherein the system channel includes the second system channel.

Statement 10. An embodiment of the disclosure includes the chassis according to statement 6, wherein the liquid cooling block, the second liquid cooling block, and the member form a single piece.

Statement 11. An embodiment of the disclosure includes the chassis according to statement 1, wherein the liquid cooling block is in thermal contact with the storage device in the slot in the member.

Statement 12. An embodiment of the disclosure includes the chassis according to statement 11, wherein the liquid cooling block and the storage device in the slot in the member are in thermal contact using a thermal interface.

Statement 13. An embodiment of the disclosure includes the chassis according to statement 11, wherein:
- the storage device includes a high thermal side and a low thermal side; and
- the liquid cooling block is in thermal contact with the high thermal side of the storage device.

Statement 14. An embodiment of the disclosure includes the chassis according to statement 11, wherein
- the liquid cooling block has a first side and a second side;
- the first side of the liquid cooling block is in thermal contact with the storage device in the slot in the member; and
- the second side of the liquid cooling block is in thermal contact with a second storage device in a second slot in the member.

Statement 15. An embodiment of the disclosure includes the chassis according to statement 1, wherein the member includes an air bypass for air cooling of a component in the chassis.

Statement 16. An embodiment of the disclosure includes the chassis according to statement 15, wherein the air bypass at a top of the member.

Statement 17. An embodiment of the disclosure includes the chassis according to statement 15, wherein the air bypass is between the liquid cooling block and a second storage device in a second slot in the member.

Statement 18. An embodiment of the disclosure includes the chassis according to statement 1, further comprising:
- a radiator, the liquid coolant flowing through the radiator; and
- a fan to blow air across the radiator to dissipate heat from the liquid coolant.

Statement 19. An embodiment of the disclosure includes the chassis according to statement 18, wherein the radiator is at a back of the chassis.

Statement 20. An embodiment of the disclosure includes the chassis according to statement 1, wherein the liquid coolant is cooled using one of a rack-level heat exchanger or a datacenter-level heat exchanger.

Statement 21. An embodiment of the disclosure includes the chassis according to statement 1, wherein the liquid coolant includes a glycol compound.

Statement 22. An embodiment of the disclosure includes the chassis according to statement 21, wherein the glycol compound is at least one of ethylene glycol or propylene glycol.

Statement 23. An embodiment of the disclosure includes the chassis according to statement 1, further comprising a pump for the liquid coolant.

Statement 24. An embodiment of the disclosure includes the chassis according to statement 23, further comprising a controller for the pump.

Statement 25. An embodiment of the disclosure includes the chassis according to statement 24, wherein:
- the chassis further comprises a second slot in the member for a second storage device;
- a first zone includes the storage device, the first zone including a first cooling allocation;
- a second zone includes the second storage device, the second zone including a second cooling allocation; and
- the controller is configured to provide the first cooling allocation to the first zone and the second cooling allocation to the second zone.

Statement 26. An embodiment of the disclosure includes the chassis according to statement 25, wherein the controller is configured to receive a request for an increase in the first cooling allocation from the storage device in the slot in the member.

Statement 27. An embodiment of the disclosure includes the chassis according to statement 26, wherein:
the liquid coolant has an additional cooling capacity; and
the controller is configured to increase the first cooling allocation of the first zone based at least in part on the additional cooling capacity.

Statement 28. An embodiment of the disclosure includes the chassis according to statement 27, wherein the controller is configured to increase a speed of the pump to increase the first cooling allocation of the first zone.

Statement 29. An embodiment of the disclosure includes the chassis according to statement 27, wherein the controller is configured to increase a speed of a fan used to dissipate heat from the liquid coolant.

Statement 30. An embodiment of the disclosure includes the chassis according to statement 26, wherein:
the liquid coolant has no additional cooling capacity; and
the controller is configured to increase the first cooling allocation of the first zone and to decrease the second cooling allocation of the second zone.

Statement 31. An embodiment of the disclosure includes the chassis according to statement 30, wherein the controller is configured to inform the second storage device of a decrease in the second cooling allocation of the second zone.

Statement 32. An embodiment of the disclosure includes a system, comprising:
a chassis;
a system board in the chassis;
a processor on the system board;
a memory on the system board;
a connector on the system board for a storage device;
an air cooling system in the chassis;
a member in the chassis including a system channel for a liquid coolant to flow to remove heat from the storage device;
a slot in the member for the storage device;
a liquid cooling block associated with the slot in the member, the liquid cooling block including a block channel for the liquid coolant to flow; and
a pump to circulate the liquid coolant in the system channel and the block channel.

Statement 33. An embodiment of the disclosure includes the system according to statement 32, wherein the chassis is a server chassis.

Statement 34. An embodiment of the disclosure includes the system according to statement 32, wherein the storage device is at least one of a hard disk drive, a first Solid State Drive (SSD), a first computational storage unit, or a second SSD including a second computational storage unit.

Statement 35. An embodiment of the disclosure includes the system according to statement 32, wherein the block channel, the system channel, and the pump to circulate the liquid coolant form a continuous path for the liquid coolant.

Statement 36. An embodiment of the disclosure includes the system according to statement 32, wherein the liquid cooling block and the member form a single piece.

Statement 37. An embodiment of the disclosure includes the system according to statement 32, further comprising:
a second slot in the member for a second storage device; and
a second liquid cooling block associated with the second slot in the member, the second liquid cooling block including a second block channel for the liquid coolant to flow to remove heat from the second storage device.

Statement 38. An embodiment of the disclosure includes the system according to statement 37, wherein the block channel, the second block channel, the system channel, and the pump to circulate the liquid coolant form a continuous path for the liquid coolant.

Statement 39. An embodiment of the disclosure includes the system according to statement 37, wherein:
the block channel, the system channel, and the pump to circulate the liquid coolant form a first continuous path for the liquid coolant; and
the second block channel, a second system channel for the liquid coolant to flow, and the pump to circulate the liquid coolant form a second continuous path for the liquid coolant.

Statement 40. An embodiment of the disclosure includes the system according to statement 39, wherein the system channel includes the second system channel.

Statement 41. An embodiment of the disclosure includes the system according to statement 37, wherein the liquid cooling block, the second liquid cooling block, and the member form a single piece.

Statement 42. An embodiment of the disclosure includes the system according to statement 32, wherein the liquid cooling block is in thermal contact with the storage device in the slot in the member.

Statement 43. An embodiment of the disclosure includes the system according to statement 42, wherein the liquid cooling block and the storage device in the slot in the member are in thermal contact using a thermal interface.

Statement 44. An embodiment of the disclosure includes the system according to statement 42, wherein:
the storage device includes a high thermal side and a low thermal side; and
the liquid cooling block is in thermal contact with the high thermal side of the storage device.

Statement 45. An embodiment of the disclosure includes the system according to statement 42, wherein
the liquid cooling block has a first side and a second side;
the first side of the liquid cooling block is in thermal contact with the storage device in the slot in the member; and
the second side of the liquid cooling block is in thermal contact with a second storage device in a second slot in the member.

Statement 46. An embodiment of the disclosure includes the system according to statement 32, wherein the member includes an air bypass for the air cooling system to air cool at least the processor in the chassis.

Statement 47. An embodiment of the disclosure includes the system according to statement 46, wherein the air bypass at a top of the member.

Statement 48. An embodiment of the disclosure includes the system according to statement 46, wherein the air bypass is between the liquid cooling block and a second storage device in a second slot in the member.

Statement 49. An embodiment of the disclosure includes the system according to statement 32, wherein:
the system further comprises a radiator, the liquid coolant flowing through the radiator; and
the air cooling system is configured to blow air across the radiator to dissipate heat from the liquid coolant.

Statement 50. An embodiment of the disclosure includes the system according to statement 49, wherein the radiator is at a back of the chassis.

Statement 51. An embodiment of the disclosure includes the system according to statement 32, wherein the liquid coolant is cooled using one of a rack-level heat exchanger or a datacenter-level heat exchanger.

Statement 52. An embodiment of the disclosure includes the system according to statement 32, wherein the liquid coolant includes a glycol compound.

Statement 53. An embodiment of the disclosure includes the system according to statement 52, wherein the glycol compound is at least one of ethylene glycol or propylene glycol.

Statement 54. An embodiment of the disclosure includes the system according to statement 32, further comprising a controller for the pump.

Statement 55. An embodiment of the disclosure includes the system according to statement 54, wherein:
the chassis further comprises a second slot in the member for a second storage device;
a first zone includes the storage device, the first zone including a first cooling allocation;
a second zone includes the second storage device, the second zone including a second cooling allocation; and
the controller is configured to provide the first cooling allocation to the first zone and the second cooling allocation to the second zone.

Statement 56. An embodiment of the disclosure includes the system according to statement 55, wherein the controller is configured to receive a request for an increase in the first cooling allocation from the storage device in the slot in the member.

Statement 57. An embodiment of the disclosure includes the system according to statement 56, wherein:
the liquid coolant has an additional cooling capacity; and
the controller is configured to increase the first cooling allocation of the first zone based at least in part on the additional cooling capacity.

Statement 58. An embodiment of the disclosure includes the system according to statement 57, wherein the controller is configured to increase a speed of the air cooling system to increase the first cooling allocation of the first zone.

Statement 59. An embodiment of the disclosure includes the system according to statement 57, wherein:
the air cooling system includes a fan; and
the controller is configured to increase a speed of a fan used to dissipate heat from the liquid coolant.

Statement 60. An embodiment of the disclosure includes the system according to statement 56, wherein:
the liquid coolant has no additional cooling capacity; and
the controller is configured to increase the first cooling allocation of the first zone and to decrease the second cooling allocation of the second zone.

Statement 61. An embodiment of the disclosure includes the system according to statement 60, wherein the controller is configured to inform the second storage device of a decrease in the second cooling allocation of the second zone.

Statement 62. An embodiment of the disclosure includes a method, comprising:
receiving a request to increase a first cooling allocation for a first zone of a liquid cooling system in a chassis, the first zone including a first storage device, the chassis including a second zone including a second storage device and a second cooling allocation; and
adjusting at least one of the first cooling allocation and the second cooling allocation based at least in part on the request.

Statement 63. An embodiment of the disclosure includes the method according to statement 62, wherein adjusting at least one of the first cooling allocation and the second cooling allocation based at least in part on the request includes:
determining that the liquid cooling system includes additional cooling capacity; and
increasing the first cooling allocation.

Statement 64. An embodiment of the disclosure includes the method according to statement 63, wherein increasing the first cooling allocation includes increasing a speed of a pump in the liquid cooling system.

Statement 65. An embodiment of the disclosure includes the method according to statement 64, wherein increasing the first cooling allocation further includes increasing a second speed of a fan to dissipate heat from the liquid cooling system.

Statement 66. An embodiment of the disclosure includes the method according to statement 63, wherein increasing the first cooling allocation includes notifying the second storage device of a decrease in the additional cooling capacity.

Statement 67. An embodiment of the disclosure includes the method according to statement 63, wherein increasing the first cooling allocation includes notifying the first storage device of an increase in the first cooling allocation.

Statement 68. An embodiment of the disclosure includes the method according to statement 62, wherein adjusting at least one of the first cooling allocation and the second cooling allocation based at least in part on the request includes:
determining that the liquid cooling system has no additional cooling capacity;
decreasing the second cooling allocation; and
increasing the first cooling allocation.

Statement 69. An embodiment of the disclosure includes the method according to statement 68, wherein decreasing the second cooling allocation includes notifying the second storage device of a decrease in the second cooling allocation.

Statement 70. An embodiment of the disclosure includes the method according to statement 68, wherein increasing the first cooling allocation includes notifying the first storage device of an increase in the first cooling allocation.

Statement 71. An embodiment of the disclosure includes a method, comprising:
receiving a request to decrease a first cooling allocation for a first zone of a liquid cooling system in a chassis, the first zone including a first storage device, the chassis including a second zone including a second storage device and a second cooling allocation; and
adjusting the first cooling allocation based at least in part on the request.

Statement 72. An embodiment of the disclosure includes the method according to statement 71, wherein adjusting the first cooling allocation based at least in part on the request includes decreasing a speed of a pump in the liquid cooling system.

Statement 73. An embodiment of the disclosure includes the method according to statement 72, wherein adjusting the first cooling allocation based at least in part on the request further includes decreasing a second speed of a fan to dissipate heat from the liquid cooling system.

Statement 74. An embodiment of the disclosure includes the method according to statement 71, further comprising notifying the second storage device of an increase in an additional cooling capacity.

Statement 75. An embodiment of the disclosure includes the method according to statement 71, further comprising notifying the first storage device of an increase in the first cooling allocation.

Statement 76. An embodiment of the disclosure includes an article, comprising a non-transitory storage medium, the non-transitory storage medium having stored thereon instructions that, when executed by a machine, result in:
receiving a request to increase a first cooling allocation for a first zone of a liquid cooling system in a chassis, the first zone including a first storage device, the chassis including a second zone including a second storage device and a second cooling allocation; and
adjusting at least one of the first cooling allocation and the second cooling allocation based at least in part on the request.

Statement 77. An embodiment of the disclosure includes the article according to statement 76, wherein adjusting at least one of the first cooling allocation and the second cooling allocation based at least in part on the request includes:
determining that the liquid cooling system includes additional cooling capacity; and
increasing the first cooling allocation.

Statement 78. An embodiment of the disclosure includes the article according to statement 77, wherein increasing the first cooling allocation includes increasing a speed of a pump in the liquid cooling system.

Statement 79. An embodiment of the disclosure includes the article according to statement 78, wherein increasing the first cooling allocation further includes increasing a second speed of a fan to dissipate heat from the liquid cooling system.

Statement 80. An embodiment of the disclosure includes the article according to statement 77, wherein increasing the first cooling allocation includes notifying the second storage device of a decrease in the additional cooling capacity.

Statement 81. An embodiment of the disclosure includes the article according to statement 77, wherein increasing the first cooling allocation includes notifying the first storage device of an increase in the first cooling allocation.

Statement 82. An embodiment of the disclosure includes the article according to statement 76, wherein adjusting at least one of the first cooling allocation and the second cooling allocation based at least in part on the request includes:
determining that the liquid cooling system has no additional cooling capacity;
decreasing the second cooling allocation; and
increasing the first cooling allocation.

Statement 83. An embodiment of the disclosure includes the article according to statement 82, wherein decreasing the second cooling allocation includes notifying the second storage device of a decrease in the second cooling allocation.

Statement 84. An embodiment of the disclosure includes the article according to statement 82, wherein increasing the first cooling allocation includes notifying the first storage device of an increase in the first cooling allocation.

Statement 85. An embodiment of the disclosure includes an article, comprising a non-transitory storage medium, the non-transitory storage medium having stored thereon instructions that, when executed by a machine, result in:
receiving a request to decrease a first cooling allocation for a first zone of a liquid cooling system in a chassis, the first zone including a first storage device, the chassis including a second zone including a second storage device and a second cooling allocation; and
adjusting the first cooling allocation based at least in part on the request.

Statement 86. An embodiment of the disclosure includes the article according to statement 85, wherein adjusting the first cooling allocation based at least in part on the request includes decreasing a speed of a pump in the liquid cooling system.

Statement 87. An embodiment of the disclosure includes the article according to statement 86, wherein adjusting the first cooling allocation based at least in part on the request further includes decreasing a second speed of a fan to dissipate heat from the liquid cooling system.

Statement 88. An embodiment of the disclosure includes the article according to statement 85, the non-transitory storage medium having stored thereon further instructions that, when executed by the machine, result in notifying the second storage device of an increase in an additional cooling capacity.

Statement 89. An embodiment of the disclosure includes the article according to statement 85, the non-transitory storage medium having stored thereon further instructions that, when executed by the machine, result in notifying the first storage device of an increase in the first cooling allocation.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A chassis, comprising:
a member including a system channel for a liquid coolant to flow and an air bypass for air cooling of a component in the chassis;
a slot for a storage device, the slot defined in part by the member and in part by a liquid cooling block associated with the slot;
a second slot for a second storage device, the second slot defined in part by the member and in part by a second liquid cooling block associated with the second slot;
the liquid cooling block associated with the slot, the liquid cooling block including a block channel for the liquid coolant to flow to remove heat from the storage device; and
the second liquid cooling block associated with the second slot, the second liquid cooling block including a second block channel for the liquid coolant to flow to remove heat from the second storage device,
wherein the block channel, the second block channel and the system channel establish a series flow path for the liquid coolant.

2. The chassis according to claim 1, wherein the block channel, the second block channel, the system channel, and a pump to circulate the liquid coolant establish the series flow path for the liquid coolant.

3. The chassis according to claim 1, wherein the liquid cooling block is in thermal contact with the storage device in the slot.

4. The chassis according to claim 1, further comprising:
a radiator, the liquid coolant flowing through the radiator; and
a fan to blow air across the radiator to dissipate heat from the liquid coolant.

5. The chassis according to claim 1, further comprising a pump for the liquid coolant.

6. The chassis according to claim 5, further comprising a controller for the pump.

7. The chassis according to claim 6, wherein:
a first zone includes the slot, the first zone including a first cooling allocation;
a second zone includes the second slot, the second zone including a second cooling allocation; and
the controller is configured to provide the first cooling allocation to the first zone and the second cooling allocation to the second zone,
wherein the first cooling allocation is different from the second cooling allocation.

8. The chassis according to claim 7, wherein the controller is configured to receive a request for an increase in the first cooling allocation from the storage device in the slot in the member.

9. The chassis according to claim 7, wherein;
the block channel, the second block channel, the system channel, and the pump to circulate the liquid coolant establish a series flow path for the liquid coolant.

10. The chassis according to claim 1, wherein the liquid cooling block is arranged to conduct heat away from a first side of the storage device that generates more heat than a second side of the storage device.

11. The chassis according to claim 1, further comprising an air cooling system for the storage device using the air bypass.

12. A system, comprising:
a chassis;
a system board in the chassis;
a processor on the system board;
a memory on the system board;
a connector on the system board for a storage device;
an air cooling system in the chassis;
a member in the chassis including a system channel for a liquid coolant to flow and an air bypass for air cooling of a component in the chassis;
a slot in the member for the storage device;
a liquid cooling block associated with the slot in the member, the liquid cooling block including a block channel for the liquid coolant to flow to remove heat from the storage device; and
a pump to circulate the liquid coolant in the system channel and the block channel.

13. The system according to claim 12, further comprising:
a second slot in the member for a second storage device; and
a second liquid cooling block associated with the second storage device, the second liquid cooling block including a second block channel for the liquid coolant to flow to remove heat from the second storage device.

14. The system according to claim 13, wherein the block channel, the second block channel, the system channel, and the pump to circulate the liquid coolant establish a series flow path for the liquid coolant.

15. The system according to claim 12, wherein the liquid cooling block is in thermal contact with the storage device in the slot in the member.

16. The system according to claim 15, wherein the liquid cooling block and the storage device in the slot in the member are in thermal contact using a thermal interface.

17. The system according to claim 12, further comprising a controller for the pump.

18. The system according to claim 12, wherein the liquid cooling block is arranged to conduct heat away from a first side of the storage device that generates more heat than a second side of the storage device.

* * * * *